US011135678B2

(12) United States Patent
Rüegg et al.

(10) Patent No.: US 11,135,678 B2
(45) Date of Patent: Oct. 5, 2021

(54) METHOD FOR PRODUCING A JOINING CONNECTION VIA WELDING AND JOINING CONNECTION PRODUCED ACCORDING TO SAID METHOD

(71) Applicant: AUDI AG, Ingolstadt (DE)

(72) Inventors: Markus Rüegg, Friolzheim (DE); Michael Ernst, Wüstenrot (DE)

(73) Assignee: AUDI AG, Ingolstadt (DE)

( * ) Notice: Subject to any disclaimer, the term of this patent is extended or adjusted under 35 U.S.C. 154(b) by 228 days.

(21) Appl. No.: 16/085,128

(22) PCT Filed: Feb. 28, 2017

(86) PCT No.: PCT/EP2017/054616
§ 371 (c)(1),
(2) Date: Sep. 14, 2018

(87) PCT Pub. No.: WO2017/167520
PCT Pub. Date: Oct. 5, 2017

(65) Prior Publication Data
US 2019/0070694 A1    Mar. 7, 2019

(30) Foreign Application Priority Data
Mar. 26, 2016  (DE) ............... 10 2016 003 801.2

(51) Int. Cl.
*B23K 26/26* (2014.01)
*B23K 33/00* (2006.01)
(Continued)

(52) U.S. Cl.
CPC .............. *B23K 26/26* (2013.01); *B23K 9/025* (2013.01); *B23K 26/32* (2013.01); *B23K 33/004* (2013.01);
(Continued)

(58) Field of Classification Search
CPC ...... B23K 26/26; B23K 26/32; B23K 33/004; B23K 33/008; B23K 2103/10
(Continued)

(56) References Cited

U.S. PATENT DOCUMENTS

| 2004/0182836 A1 | 9/2004 | Becker et al. |
| 2009/0230108 A1* | 9/2009 | Nakahara ............... B23K 9/091 |
| | | 219/137 PS |

FOREIGN PATENT DOCUMENTS

| AT | 13 491 U1 | 1/2014 |
| CN | 201760712 U | 3/2011 |

(Continued)

OTHER PUBLICATIONS

International Search Report with English translation and Written Opinion of the International Search Authority dated Jun. 6, 2017 of corresponding International application No. PCT/EP2017/054616; 15 pgs.

(Continued)

*Primary Examiner* — Thien S Tran
(74) *Attorney, Agent, or Firm* — Maier & Maier, PLLC

(57) ABSTRACT

A joining connection with a weld seam running between a first metal component and a second metal component and produced by a beam welding method. The weld seam has a weld seam main section extending along a joining gap formed between the metal components, the weld seam has a weld seam starting section leading from the direction of the joining gap into the first or second component. The first or second component has a recess in the region of the weld seam starting section that is lowered in relation to the upper edges of the two components forming the joining gap, and/or the weld seam has a weld seam end section leading from the direction of the joining gap into the first or second component.

6 Claims, 2 Drawing Sheets

(51) Int. Cl.
*B23K 9/025* (2006.01)
*B23K 26/32* (2014.01)
*B23K 103/10* (2006.01)

(52) U.S. Cl.
CPC ........ *B23K 33/008* (2013.01); *B23K 2103/10* (2018.08)

(58) Field of Classification Search
USPC .................. 219/74, 75, 126, 127, 145.21
See application file for complete search history.

(56) References Cited

FOREIGN PATENT DOCUMENTS

| | | |
|---|---|---|
| CN | 203045113 U | 7/2013 |
| CN | 204234946 U | 4/2015 |
| DE | 10 2008 029 724 B4 | 9/2010 |
| DE | 10 2009 052 220 A1 | 5/2011 |
| DE | 102010053526 A1 | 6/2012 |
| DE | 102012015777 A1 | 3/2013 |
| JP | H07-246464 A | 9/1995 |
| JP | 2009-012012 A | 1/2009 |
| JP | 2011136350 A * | 7/2011 |
| WO | 2015/058225 A2 | 4/2015 |

OTHER PUBLICATIONS

Notification of Transmittal of Translation of the International Preliminary Report on Patentability dated Oct. 11, 2018, in connection with corresponding international Application No. PCT/EP2017/054616 (8 pgs.).

Examination Report dated May 27, 2020, in corresponding European patent application No. 17 707 856.5 including partial machine-generated English language translation, 5 pages.

\* cited by examiner

METHOD FOR PRODUCING A JOINING CONNECTION VIA WELDING AND JOINING CONNECTION PRODUCED ACCORDING TO SAID METHOD

FIELD

The invention relates to a joining connection comprising a weld seam running between a first metal component and a second metal component and produced by means of a beam welding method as well as a method for producing the joining connection according to the invention. Moreover, the invention relates to a subassembly made from a first metal component and a second metal component that are joined by the joining connection according to the invention.

BACKGROUND

When joining metal components, especially components made of aluminum, for example, with an arc welding process or a laser beam welding, elevations are created in the initial or starting region of a weld seam that need to be removed by machining if such a welded joint is visible to the user, e.g., in bodywork construction.

SUMMARY

An object of the invention is to indicate a joining connection comprising a weld seam running between a first metal component and a second metal component and produced by means of a beam welding method, especially an arc welding process. Moreover, another object that the invention proposes to achieve is to create a method for producing such a joining connection according to the invention.

Such a joining connection comprising a weld seam running between a first metal component and a second metal component and produced by means of a beam welding method is characterized according to the invention in that the weld seam has a weld seam main section extending along a joining gap formed between the metal components, the weld seam has a weld seam starting section leading from the direction of the joining gap into the first or second component, wherein the first or second component has a recess in the region of the weld seam starting section that is lowered in relation to the upper edges of the two components forming the joining gap, and/or the weld seam has a weld seam end section leading from the direction of the joining gap into the first or second component, wherein the first or second component has a recess in the region of the weld seam end section that is lowered in relation to the upper edges of the two components forming the joining gap.

With such a recess produced outside the joining gap or the weld seam, an elevation formed in the starting and/or end point of the weld seam is leveled out, since the recess can accommodate more weld material and therefore an elevation is prevented. This eliminates any reworking to remove a weld seam elevation.

During electric arc or laser beam welding, a so-called end crater is formed at the end of a weld seam, which is formed as a consequence of the volume shrinkage of the solidified melt. Such an end crater produces a notch effect in the region of the weld seam and leads to a weakening of the joining connection. With an end point of the weld seam in the region of the lowered recess, the notch effect is significantly reduced, since now the end crater lies outside the joining gap.

According to an advantageous enhancement of the invention, the lowered recess is formed conically broadening from the weld seam main section perpendicular to the plane of the joining gap. In this way, sufficient space is present to accommodate weld material of the weld seam starting section in the starting region of the weld seam.

Another advantageous embodiment of the invention proposes that the first metal component is formed as an extruded profile or a cast component, and the second metal component is formed as a cast component with at least one recess to accommodate the weld seam starting section and/or the weld seam end section.

Thus, this lowered recess can be realized as the second metal component at the same time as the production of the cast component, so that no additional expense is caused. Preferably, the first metal component and the second metal component are produced from an aluminum material.

In this method according to the invention for producing a joining connection comprising a weld seam running between a first metal component and a second metal component and produced by means of an energy beam, the following steps of the method are performed:

creating a weld seam starting section of the weld seam in a region of the first or second component, wherein this region is formed as a recess which is lowered in relation to the upper edges of the two components forming a joining gap, guiding the energy beam proceeding from the region of the weld seam starting section into the joining gap formed by the metal components, and creating a weld seam main section along the joining gap formed by the metal components.

In this method for producing a joining connection comprising a weld seam running between a first metal component and a second metal component and produced by means of an energy beam, the following steps of the method are performed:

creating a weld seam main section by means of an energy beam along the joining gap formed by the metal components, and creating a weld seam end section of the weld seam in a region of the first or second component by means of the energy beam led out from the joining gap, wherein this region is formed as a recess which is lowered in relation to the upper edges of the two components forming a joining gap.

The slight additional expense for the longer weld seam is more than compensated by the eliminating of the reworking of a weld seam elevation.

It is offered according to an enhancement of the invention to employ both methods for producing a joining connection, i.e., to begin the weld seam in the region of a local recess with a weld seam starting section and to end in the region of a local recess with a weld seam end section, wherein the local recesses lie outside the joining gap in one of the two components.

Preferably, the electric arc of an arc welding process is used as the energy beam in the method according to the invention.

BRIEF DESCRIPTION OF THE DRAWINGS

The invention shall be described more closely below with the aid of an exemplary embodiment, making reference to the appended figures. Shown are.

DETAILED DESCRIPTION

Figure 1:
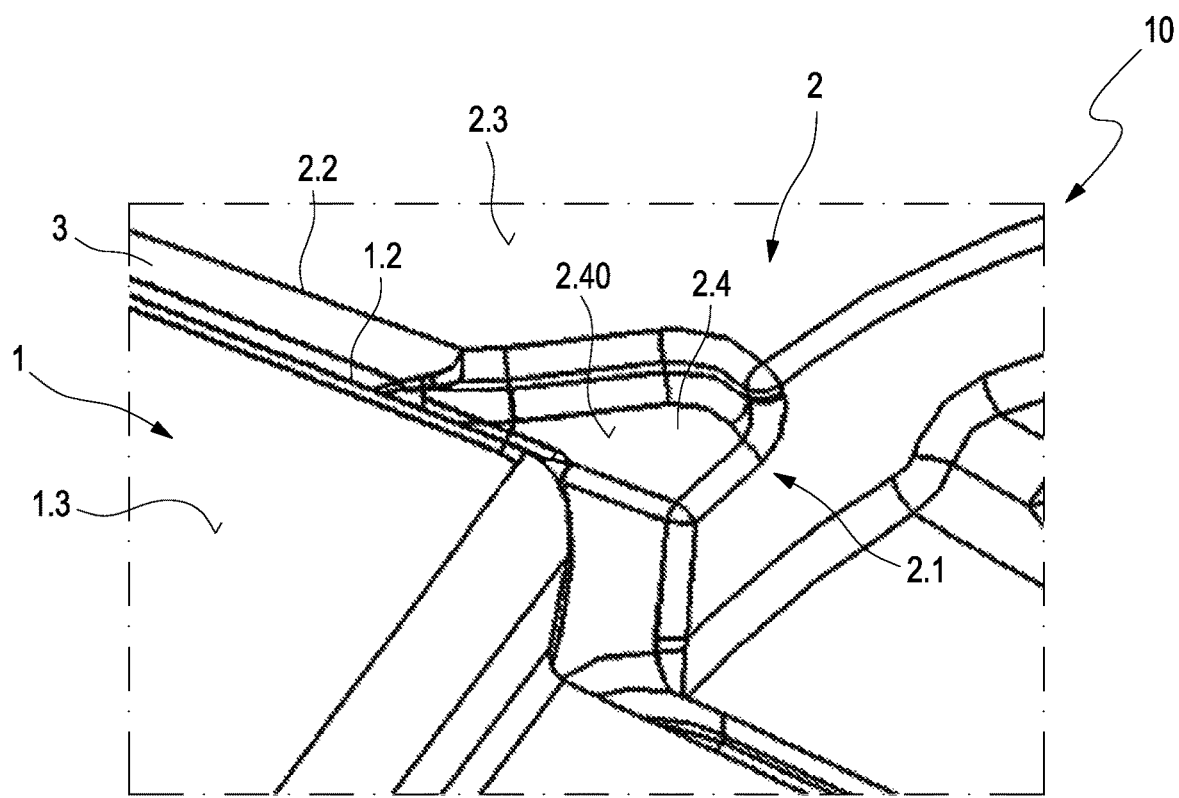
FIG. 1 a schematic and perspective partial representation of two components of a subassembly which are to be joined by means of a weld seam and which are prepared according to the invention.
Figure 2:
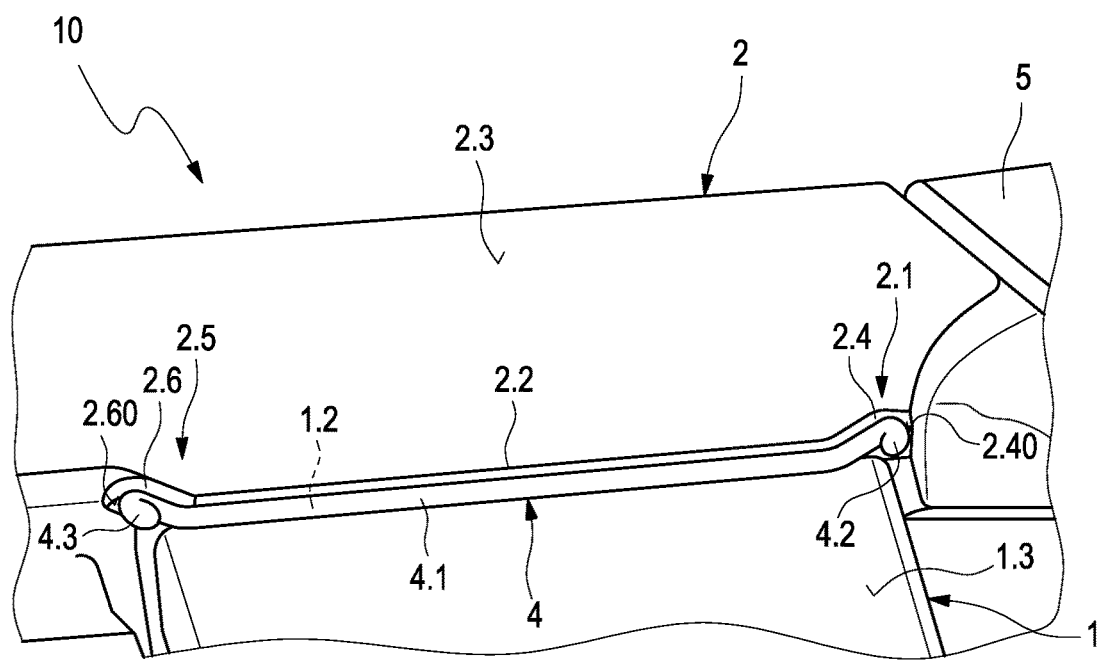
FIG. 2 a schematic and perspective representation of the components of FIG. 1 with a joining connection according to the invention.

FIG. 1 shows in a partial representation a portion of a subassembly 10 made from a first metal component 1 and a second metal component 2, wherein these two components 1 and 2 are placed against each other to form a joining gap 3 and are connected according to FIG. 2 by means of a weld seam 4 along this joining gap 3. An arc welding process is used, for example, to produce the weld seam 4.

Figure 3:
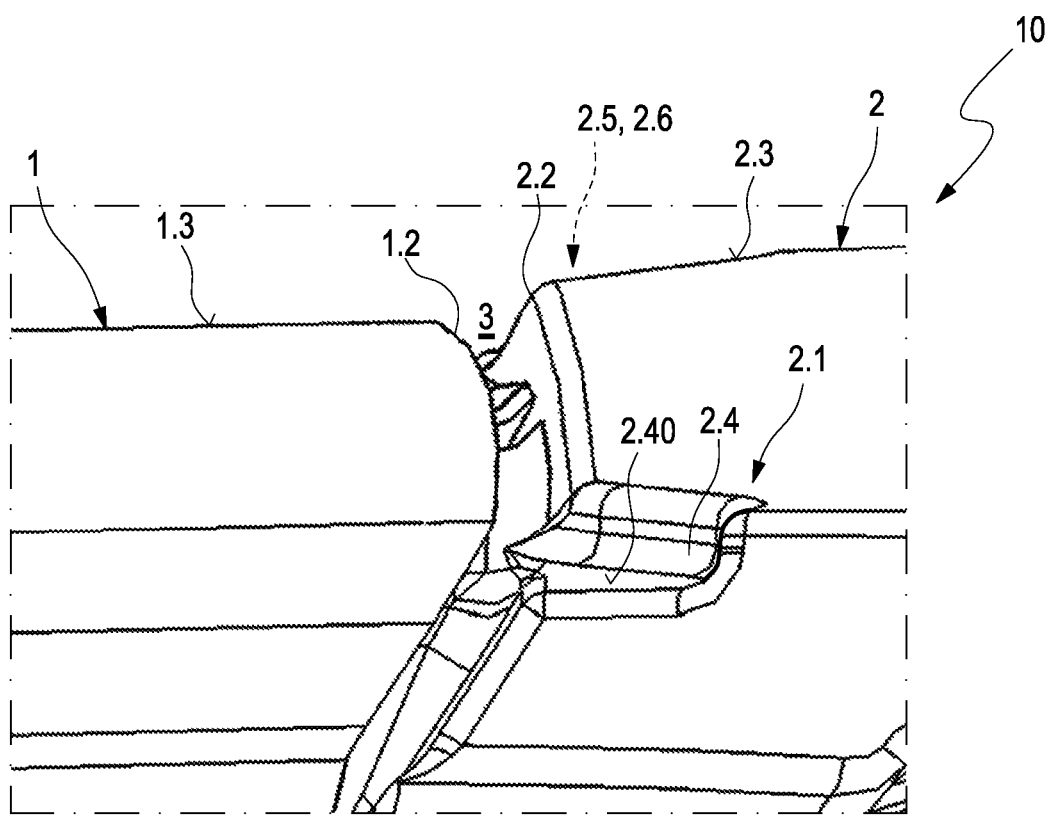
FIG. 3 a schematic and perspective representation of the unjoined subassembly of FIG. 1 in a side view.

This weld seam 4 comprises several sections, according to FIG. 2. Thus, a weld seam main section 4.1 forms a weld seam guided along the joining gap 3. The weld seam 4 begins in a starting region 2.1 of the second component 2 with a weld seam starting section 4.2. This starting region 2.1 thus constitutes a starting point for the energy beam, i.e., the electric arc of the arc welding process, and it is guided from that point into the joining gap 3 to create the weld seam main section 4.1. In order to avoid a weld seam elevation forming in this starting region 2.1 by the creating of the weld seam starting section 4.2, this starting region 2.1 of the component 2 is formed as a recess 2.4 which is lowered as compared to the upper edges 1.2 and 2.2 of the two components 1 and 2 forming the joining gap 3, as will be further explained below with the aid of FIGS. 1 and 3.

According to this FIG. 1, the recess 2.4, which is produced in the component 2, and which is lowered as compared to the upper edges 1.2 and 2.2 of the two components 1 and 2 forming the joining gap 3, adjoins the end of the joining gap 3. Hence, the bottom surface 2.40 of this recess 2.4 lies deeper than the adjoining top surfaces 1.3 and 2.3 of the first component 1 and the second component 2, as can be seen in particular in FIG. 3. According to FIG. 2, starting from the weld seam main section 4.1, the weld seam 4 extends out from the joining gap 3 at an acute angle to the direction of the joining gap 3 and perpendicular to its plane into the recess 2.4 which broadens conically into the component 2. The conically broadening contour of the recess 2.4, starting from the joining gap 3, can be recognized in FIGS. 1 and 3.

Hence, the electric arc with starting point of the recess 2.4 is guided at an acute angle to the direction of the joining gap 3, creating the welding beam starting section 4.2, into the joining gap 3 and along it, creating the weld seam main section 4.1, which transitions into a last section of the weld seam 4, namely, into a weld seam end section 4.3.

For this purpose, another lowered recess 2.6 produced in the same way as the recess 2.4 adjoins the opposite end of the joining gap 3, likewise extending from the joining gap 3 and perpendicular to it in a conically broadening contour into the second component 2. This additional recess 2.6 constitutes an end region 2.5 for the weld seam 4.

This additional recess 2.6 also has a bottom surface 2.60, which is lowered relative to the upper edges 1.2 and 2.2 of the two components 1 and 2 forming the joining gap 3. Hence, the bottom surface 2.60 of this recess 2.6 in the same manner lies deeper than the adjoining surfaces 1.3 and 2.3 of the first component 1 and the second component 2.

Hence, the electric arc is guided from the weld seam main section 4.1, which has already been created in the joining gap 3, at an acute angle to the direction of the joining gap 3, creating the weld seam end section 4.3, into the additional recess 2.6. Increased weld material is formed in this end region 2.5 as compared to the joining gap 3, which, thanks to the lowered additional recess 2.6 is taken up so that no weld seam elevation can be formed.

The first metal component 1 is fashioned as an aluminum extruded profile, while the second metal component is produced as a cast aluminum component. Hence, the local recesses 2.4 and 2.6 can be realized in this cast aluminum component at the same time as the casting process. Accordingly, no additional expense is required for the making of these recesses.

A cast component may also be used as the first metal component 1.

The component 2 is produced as cast aluminum nodes for a vehicle bodywork, which is connected to additional components 5 (see FIG. 2) likewise by way of a welded connection.

The invention claimed is:

1. A joining connection with a weld seam running between a first metal component and a second metal component and produced by a welding method, comprising:
    the weld seam has a weld seam main section extending along a joining gap formed between two components, wherein the two components are the first metal component and the second metal component;
    the weld seam has a weld seam starting section leading from a direction of the joining gap into the first or second component, wherein the weld seam starting section is a recess formed in an upper edge of one of the first or second component along the joining gap and creates a lowered surface in relation to the upper edges of the two components forming the joining gap, and/or
    the weld seam has a weld seam end section leading from the direction of the joining gap into the first or second component, wherein the weld seam end section is a recess formed in the upper edge of one of the first or second component along the joining gap and creates a lowered surface in relation to the upper edges of the two components forming the joining gap.

2. The joining connection as claimed in claim 1, wherein the lowered recess is formed conically broadening, proceeding from the weld seam main section perpendicular to a plane of the joining gap.

3. The joining connection as claimed in claim 1, wherein the first metal component is formed as an extruded profile or a cast component, and
    the second metal component is formed as a cast component with at least one recess to accommodate the weld seam starting section and/or the weld seam end section.

4. The joining connection as claimed in claim 1, wherein the first metal component and the second metal component are produced from an aluminum material.

5. A method for producing a joining connection comprising a weld seam running between a first metal component and a second metal component and produced by an energy beam, comprising:
    forming a joining gap between two components, wherein the two components are the first metal component and the second metal component;
    creating a weld seam starting section of the weld seam formed in the first or second component, wherein the weld seam starting section is formed as a recess in an upper edge of the first or the second component along the joining gap and which creates a lowered surface in relation to the upper edges of the two components forming the joining gap, guiding the energy beam proceeding from the weld seam starting section into the joining gap formed by the metal components, and creating a weld seam main section along the joining gap formed by the metal components.

6. A method for producing a joining connection with a weld seam running between a first metal component and a second metal component and produced by an energy beam, comprising:

forming a joining gap between two components, wherein the two components are the first metal component and the second metal component;

creating a weld seam main section along the joining gap formed by the metal components by means of an energy beam, and creating a weld seam end section of the weld seam formed in the first or second component, wherein the weld seam end section is formed as a recess in an upper edge of the first or the second component along the joining gap and which creates a lowered surface in relation to upper edges of the two components forming the joining gap, guiding the energy beam proceeding from the weld seam main section into the weld seam end section.

\* \* \* \* \*